United States Patent [19]
Ohishi

[11] Patent Number: 5,277,163
[45] Date of Patent: Jan. 11, 1994

[54] FUEL-INJECTION DEVICE

[75] Inventor: Takashi Ohishi, Higashimatsuyama, Japan

[73] Assignee: Zexel Corporation, Tokyo, Japan

[21] Appl. No.: 27,244

[22] Filed: Mar. 3, 1993

[30] Foreign Application Priority Data

Mar. 4, 1992 [JP] Japan ................................ 4-82836

[51] Int. Cl.$^5$ .............................................. F02M 41/00
[52] U.S. Cl. ................................... 123/467; 123/490; 123/458; 123/506
[58] Field of Search ............... 123/467, 458, 506, 494, 123/490

[56] References Cited

U.S. PATENT DOCUMENTS

| | | | |
|---|---|---|---|
| 4,475,507 | 10/1984 | Miyaki | 123/458 |
| 4,667,633 | 5/1987 | Stumpp | 123/494 |
| 4,721,086 | 1/1988 | Scarnera | 123/490 |
| 4,726,389 | 2/1988 | Minoura | 123/490 |
| 4,770,178 | 9/1988 | Sauser | 123/490 |
| 4,788,960 | 12/1988 | Oshizawa | 123/458 |
| 4,793,313 | 12/1988 | Paganon | 123/506 |
| 4,922,878 | 5/1990 | Shinogle | 123/490 |
| 5,099,814 | 3/1992 | Ament | 123/458 |
| 5,176,120 | 1/1993 | Takahashi | 123/467 |
| 5,195,492 | 3/1993 | Groneberg | 123/506 |

FOREIGN PATENT DOCUMENTS 0118545  6/1986  Japan ................................ 123/490

*Primary Examiner*—Carl S. Miller
*Attorney, Agent, or Firm*—Wenderoth, Lind & Ponack

[57] ABSTRACT

A fuel-injection device adjusts a fuel-injection level with a solenoid valve disposed in a fuel-supply passage which supplies the fuel to a compressor. A pulse width of a drive pulse to actuate the solenoid valve, which is determined by the sum of a time lag in the valve's closing caused by the motion of the valve member of the solenoid valve and of the time length at which the valve is to remain closed, is made shorter than the time lag in the valve's closing when the engine load is low. Current supplied to the solenoid is thus cut off immediately before the solenoid valve is completely closed, and a preflow caused by a rise in injection-pressure is reduced.

10 Claims, 6 Drawing Sheets

FIG. 5 (Normal Injection-level Control)
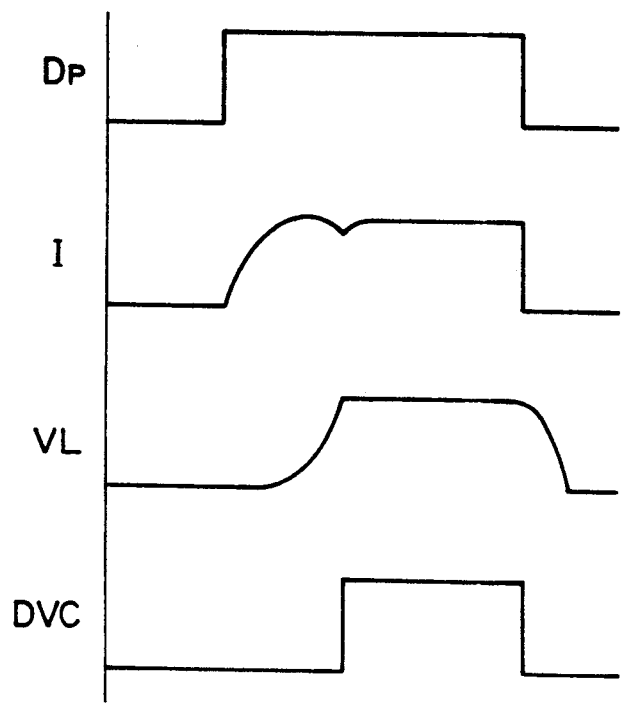
FIG. 6 (Minimal Injection-level Control)
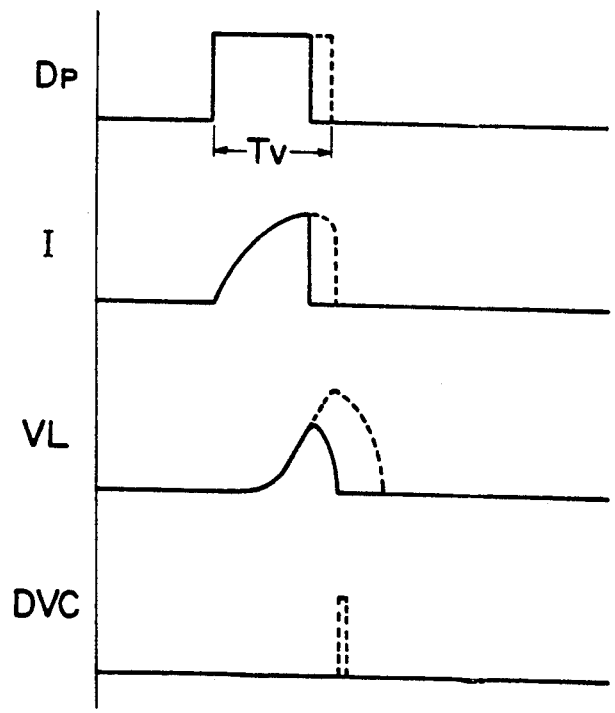

FUEL-INJECTION DEVICE

BACKGROUND OF THE INVENTION

1. Field of the Invention

This invention pertains to a fuel-injection device which controls the amount of fuel-injection in an internal combustion engine by an opening/closing control of a solenoid valve installed at some point along a fuel-supply passage leading to the compressor of a fuel injection pump.

2. Related Art

Regarding fuel-injection devices, for example, the device disclosed in Japanese Kokai Patent Publication No. 61-268844 is well-known.

With this device, as shown by the formula (1) below, a pulse width Td for operating the solenoid valve is determined by the sum of the time delay in opening/closing of the valve and the injection time Tq corresponding to the desired injection level, to control the fuel-injection level of the internal combustion engine.

$$Td = Tv + Tq \quad \text{formula (1)}$$

The Tv is almost constant regardless of the injecting conditions, and the drive pulse width Td can be adjusted by changing the Tq. FIG. 5 shows an ordinary injection-level control.

Once the drive pulse (Dp) corresponding to the Td is generated, based on this Dp, the solenoid valve is supplied with current which is generated for the time length Tv necessary to completely close the solenoid with greater valve lift, and with the current that is put out during the time length Tq necessary to keep the valve closed (the condition when DVC is high).

In the aforementioned control, to obtain a minimal injection level, the Tq can be set at 0, and Td=Tv, as shown by the broken lines in FIG. 6. However, when the solenoid valve is actually controlled by the Tv pulse width, electrical conduction to the solenoid valve is continued until the communication between the high-pressure side and the low-pressure side is cut off; therefore, some time passes before the solenoid valve is completely opened again as it was in the earlier driving condition, and a substantial amount of fuel is injected due to the preflow caused by an injection pressure rise that occurs at this time.

This fuel-injection becomes significant as the rotation rate increases and the oil supply rate from the pumping system becomes greater; therefore, the inconvenience is that injection control is impossible when the engine load is small and the engine rotation rate is great (high idle time), in other words, when the domain below the a line in FIG. 7 is larger.

SUMMARY OF THE INVENTION

The object of this invention is to solve these problems, and to offer a fuel-injection device wherein the injection-control range is expanded in the low load and high rotation condition.

The device of the present invention is characterized in that it comprises: a solenoid valve installed in the fuel-supply passage leading to the compressor of the fuel-injection pump, for adjusting the communication condition between the high-pressure side and the low-pressure side; a pulse-width-determining (pulse supply length computation) means to control the pulse width, of a drive pulse for driving said solenoid valve, which is determined by the time lag in closing the solenoid valve and by the time length needed to put out the desired injection level, to be shorter than said time lag in closing the valve when the engine load is low such as when the engine idles; a valve control means that provides current to the solenoid of said solenoid valve during the time length corresponding to said pulse width, to control the level of fuel-injection of the internal combustion engine.

Accordingly, at the time of low load, the pulse width for actuating the solenoid valve becomes shorter than the time lag in closing the valve, and the supply of current is completed before communication between the high-pressure side and the low-pressure side in the solenoid valve is completely cut off; therefore, the valve may possibly be closed by inertia, but the time length needed for the high-pressure side to become independent of the low-pressure side can be minimized or eliminated. In other words, the fuel on the high-pressure side is leaked to the low-pressure side at the time of low load, reducing the preflow caused by the injection pressure rise, which virtually reduces the constriction of the high-pressure oil passage, whereby, the aforementioned object can be attained.

BRIEF DESCRIPTION OF THE DRAWINGS

FIG. 5 is a graph showing the relationship between the drive pulse Dp in an ordinary fuel injection control of the fuel-injection device, the current supply I to the solenoid, the valve lift VL, and the signals indicating the valve seating DVC.

FIG. 6 is a graph in which the solid lines indicate the characteristics of drive pulse Dp, current supply I for the solenoid, valve lift VL, and of signals indicating the valve seating DVC in the minimal injection-level control of the fuel-injection device, and the dotted lines indicate the characteristics of drive pulse Dp, current supply I for the solenoid, valve lift VL, and of valve seating signal DVC.

DESCRIPTION OF THE PREFERRED EMBODIMENT

An example of the preferred embodiment of the invention is explained below in detail with reference to the drawings.

Figure 1:
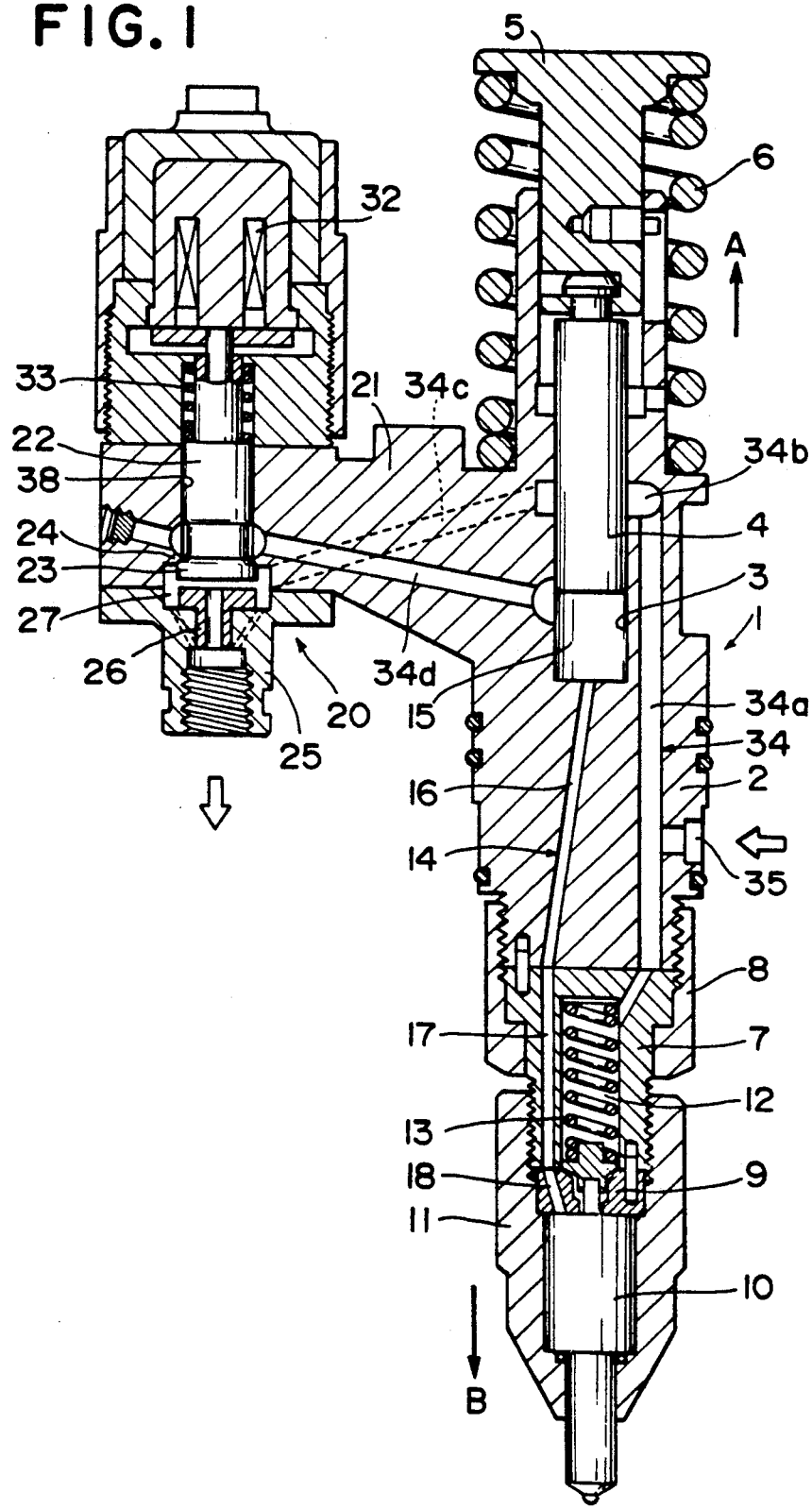
FIG. 1 is a partial sectional view of an embodiment of the fuel-injection device of the present invention.

FIG. 1 shows that the fuel-injection device has a unit injector-type injection pump 1 supplying the fuel by injection to each cylinder of the diesel engine, and that this injection pump 1 has a plunger barrel 2, in whose base, cylinder 3 is formed, and into this cylinder 3, plunger 4 is slidably inserted. A spring receptacle is formed in plunger barrel 2, and between this spring receptacle of plunger 2 and tappet 5 connected to plunger 4, spring 6 is inserted. By this spring 6, plunger 4 is constantly pushed away from plunger barrel 2 (in the direction shown by A in the figure).

Tappet 5 contacts a cam formed on a drive shaft not shown in the figure. The drive shaft is rotatably connected to the engine, and it cooperates with said spring 6 to cause plunger 4 to reciprocate in cylinder 3. By this reciprocation of plunger 4, the fuel inside compression chamber 15 surrounded by plunger 4 and plunger barrel 2 is compressed, and the fuel is sucked into compression chamber 15.

In the end of plunger barrel 2, holder 7 is integrated around its end with screwing holder nut 8 secured to holder 7. In this holder 7, nozzle 10 is integrated via spacer 9, and these spacer 9 and nozzle 10 are secured to the end of holder 7 by screwing in retaining nut 11 around the end. In holder 7, spring case 12 is formed, and the needle valve of the nozzle not indicated in the figure is pressed in a direction toward the nozzle's end (B arrow direction in the figure) by nozzle spring 13 accommodated in spring case 12.

The nozzle has a well-known structure; once the high-pressure fuel is supplied via a high-pressure passage 14, the needle valve is opened, and the fuel is injected from the injection hole made in the tip end of nozzle.

High-pressure passage 14 consists of passage 16 which is made inside plunger barrel 2, with one end opened to compressor 15, passage 17 made in holder 7 connected to this passage 16, passage 18 made in spacer 9 connected to this passage 17, and of a passage (not indicated in the figure) made in nozzle 10 connected to passage 18.

On one side of plunger barrel 2, valve housing 21 having solenoid valve 20 is integrally installed as to extend, and on plunger barrel 2 and valve housing 21, fuel supply passage 34 is installed to supply the fuel to compressor 15. Fuel supply passage 34 comprises: first oil supply passage 34a, to which the fuel is supplied from fuel intake 35 made in the side of plunger barrel 2; loop-formed depression 34b connected to this first oil supply passage 34a and formed on cylinder 3 where plunger 4 is constantly sliding; second oil supply passage 34c connected to this loop-formed depression 34b, and to valve case 27 of solenoid valve 20 which will be described later; third oil supply passage 34d connected, at its one end, to loop-formed groove 39 formed to surround rod 22 so as to be connected to valve case 27 via a valve, and connected, at other end, to compressor 15.

Figure 2:
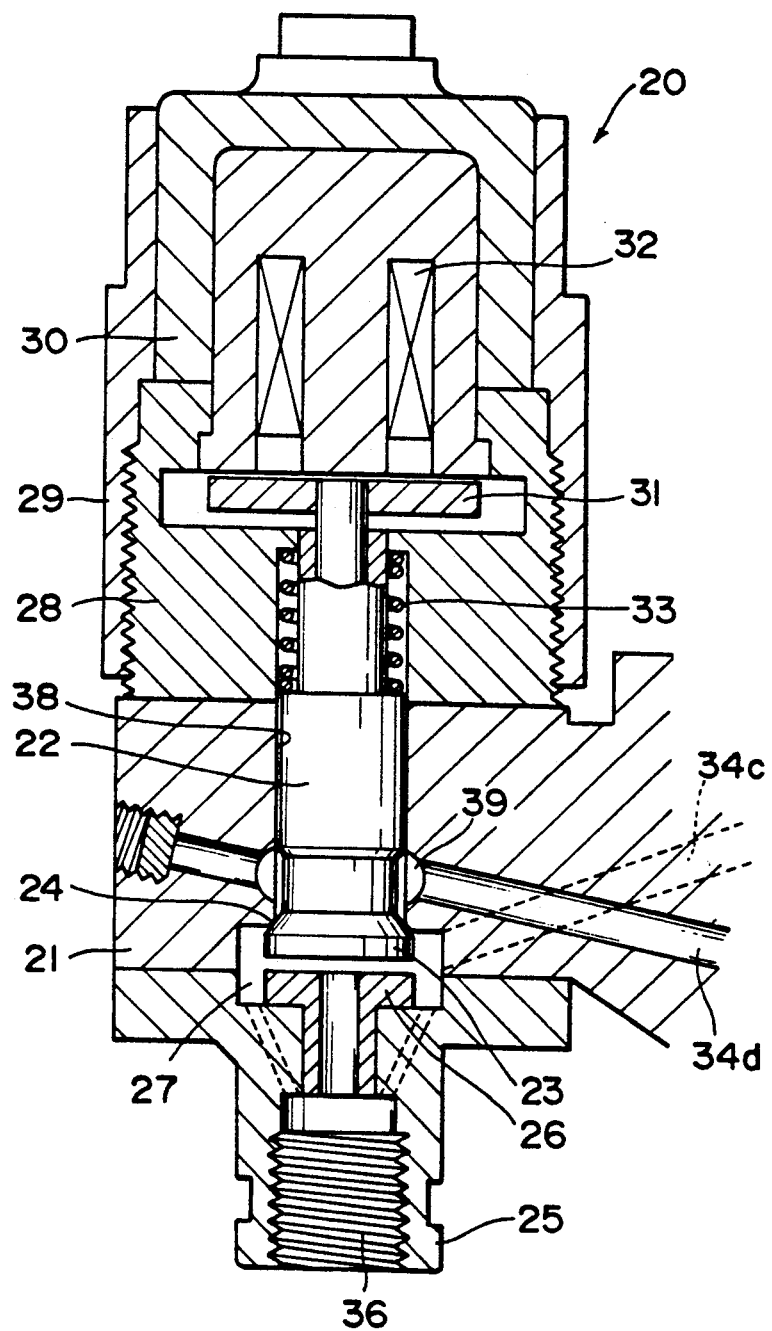
FIG. 2 is an enlarged view of the solenoid valve of the fuel-injection device of FIG. 1.

The fuel supply to compression chamber 15 is adjusted by solenoid valve 20, and rod 22 of this solenoid valve 20 is, as shown in FIG. 2, slidably inserted in sliding hole 38 made in valve housing 21. On valve housing 21, valve seat 24 contacting a poppet-type valve 23 formed at the tip end of rod 22 is installed, and to cover valve 23, header 25 is fastened to housing 21 with a screw. On the surface where header 25 and valve housing 21 are jointed, valve case 27 surrounded by header 25 and valve housing 21 is formed, and in valve case 27, a valve stopper 26 is installed so as to face valve 23 secured to header 25.

Rod 22 goes through holder 28 secured, with a screw, to the other side of header 25 of valve housing 21, and is connected to armature 31 positioned between holder 28 and solenoid-accommodating barrel 30 connected, via holder nut 29, to holder 28. This armature 31 faces solenoid 32 supported by solenoid-accommodating barrel 30. In holder 28, spring 33 that is constantly pushing valve 23 away from valve seat 24 is accommodated; valve 23 is normally kept away from valve seat 24, and when armature 31 is attracted to solenoid 32 by electrical conduction, valve member 23 is actuated toward valve seat 24.

Rod 22 has a slightly smaller diameter than valve member 23 at its front. In sliding hole 38, loop-formed groove 39 faces this portion of the smaller diameter, and to this loop-formed groove 39, said third fuel supply passage 34c is connected. To said valve member case 27, said second fuel supply passage 34c is connected, and the fuel is constantly supplied and filled via passage 34c. Accordingly, when valve member 23 is moving away from valve seat 24 and plunger 4 is in the middle of a suctioning operation, the fuel filling in valve member case 27 passes through the space between rod 22 and sliding hole 38 to reach loop-formed groove 39, from which the fuel is supplied to compressor 15 via fuel supply passage 34d. At this time, the fuel pressure is app. 5 kg/cm$^2$.

When solenoid 32 is provided with electrical conduction, in other words, when valve member 23 comes down to valve seat 24, fuel supply passage 34 is cut off by solenoid valve 20, and the fuel that has already been supplied to compression chamber 15 is compressed by a compressing operation of said plunger 4, and is supplied to nozzle 10 via high-pressure passage 14. This pressure-supplying of fuel is completed when electrical conduction to solenoid 32 is stopped, valve member 23 is moved away from valve seat 24, a portion of high-pressure fuel on the high-pressure side (high-pressure passage 14 compression chamber 15, and third fuel supply passage 34d) is returned to valve member case 27, and the fuel pressure in the compressor is drastically reduced.

Figure 3:
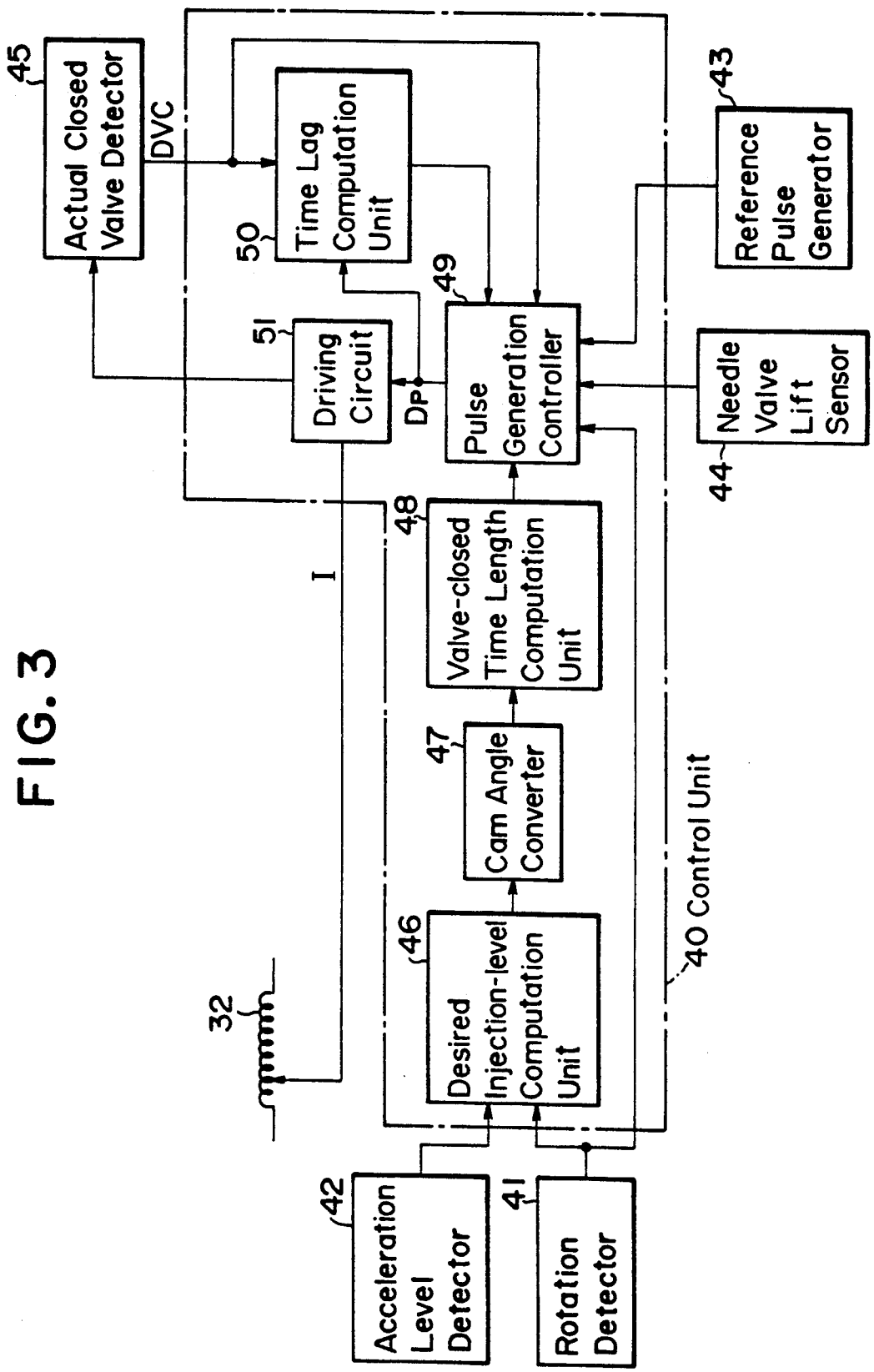
FIG. 3 is a block diagram of the control unit of the fuel-injection device of the present invention.

The electrical conduction to solenoid 32 is, as shown in FIG. 3, controlled by control unit 40, which consists of an A/D converter, multiplexer, microcomputer, driving circuit, which are all well-known, and this control unit 40 receives the signals from each of rotation sensor 41 detecting an engine rotating condition, acceleration detector 42 detecting the stepping level of acceleration pedal (acceleration level), reference pulse generator 43 generating pulses each time the drive shaft mounted to the drive axle reaches a reference angle position, needle valve lift sensor 44 detecting the lift timing of the needle valve of nozzle 10, and from closed-valve detector 45 detecting the closed condition of solenoid valve 20 and signaling when solenoid valve 20 is closed.

In FIG. 3, the processes conducted in the aforementioned control unit 40 are shown by the block diagram showing each function. With reference to this diagram, an example of the control operations in control unit 40 is explained below. The output signals from rotation detector 41 and from acceleration level detector 42 are input in the desired injection-level-computation unit 46, and based on these input signals, the most desirable injection level for engine operation at the time of signal input is computed from the map data, to be put out as the desired injection signals.

The desired injection signals are input in cam angle converter 47, and based on the prescribed map data, the cam angle necessary for obtaining the most desirable injection level is computed according to the rotation rate of the engine, and is put out as the cam angle signals.

At valve closed-time-computation unit 48, the cam angle signals are received, and these cam angle signals are converted to the valve closed-time length necessary for the cam to rotate to the angle computed at cam angle converter 47. In other words, this unit computes the time length Tq (the time length while the valve is closed) necessary for the injection to start, upon closing of solenoid valve 20, and to stop after the desired amount of fuel has been injected.

Valve closed-time length Tq, computed herein, does not include the time lag Tv that occurs as a result of the motion wherein valve 23 apart from valve seat 24 is moved and placed on valve seat 24.

Therefore, actual pulse width Td necessary for operating solenoid valve 20 is composed of the sum of Tq and Tv.

Pulse generation controller 49 adds the valve closed-time length Tq computed at said valve closed-time length computation unit 48 and time lag Tv computed at time lag computation unit 50, and determines the output timing of drive pulse Dp having drive pulse width Td determined by these Tq and Tv, in other words, the optimum timing for starting the fuel injection, on the bases of reference signal generated from reference pulse generator 43, injection timing signals put out from needle valve lift sensor 44, and rotation signals put out from rotation detector 41.

Driving circuit 51, upon receiving drive pulse Dp, puts out the drive current corresponding to the time lag Tv necessary to actuate valve 23 toward complete closing and, subsequently, puts out the drive current corresponding to the valve closed-time length Tq necessary for keeping valve member 23 closed; therefore, the current waveforms I shown in FIG. 5 are supplied to solenoid 32.

Time lag Tv is determined based on the fact that current waveforms I supplied to solenoid 32 change at the time when the valve has been completely closed, as follows: the changes in voltage signals corresponding to the current waveforms are detected at closed valve detector 45 valve seating signals DVC are put out to time-lag computation unit 50 at the point when the change in the voltage signals is detected; at this time-lag computation unit 50, the time length until seating signals DVC are generated after drive pulse Dp is put out is measured; an average value of this measured value is computed.

The drive pulse width Td (=Tv+Tq) computed at said pulse-generation controller 49 has constant time lag Tv regardless of conditions and, therefore, can be primarily changed by changing the Tq. In the control of normal driving, the Tq always has a positive value, and the drive pulse width Td is greater than the time lag Tv. On the other hand, at the time of idling when the engine load is small, a negative value is allowed for the Tq, and the drive pulse width Td is set to be smaller than the time lag Tv.

Figure 4:
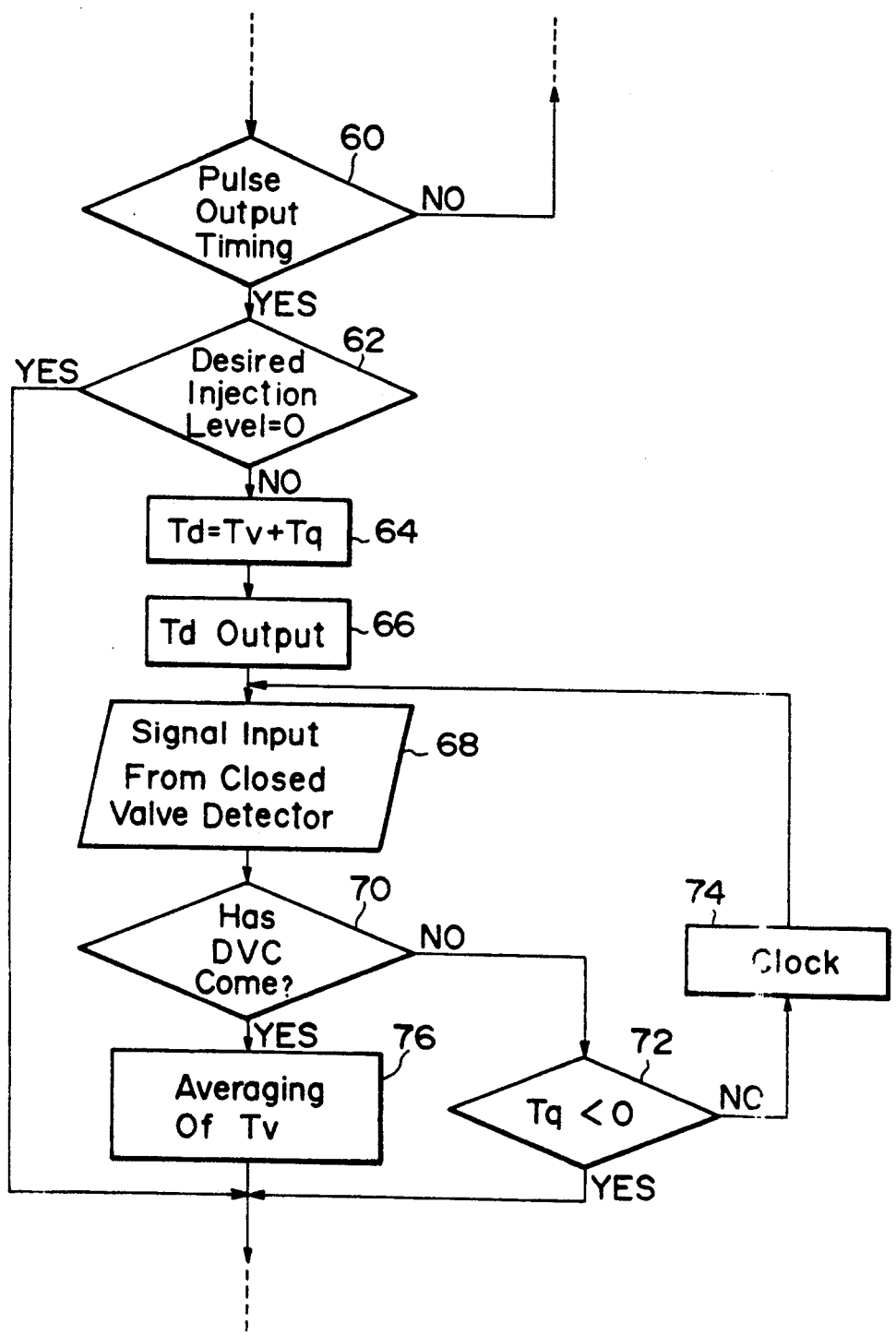
FIG. 4 is a flowchart of the operation of the control unit shown in FIG. 1.

The process shown in each block in said control unit 40 excluding the drive circuit is executed according to the prescribed program stored in the microcomputer. The flowchart in FIG. 4 shows an example of the primary process in pulse generation controller 49 and time-lag computation unit 50.

The following is an explanation of the flowchart. Control unit 40, prior to these processes, processes the acceleration-level signals, signals for engine rotating condition, signals from the needle valve lift sensor, and goes through the step of inputting the reference pulse signals and the step of computing the desired injection level and the valve closed-time length. After going through these processes, control unit 40 moves to Step 60.

In Step 60, it is judged whether it is the right time to put out drive pulse Dp or not, on the bases of the signals for engine rotation condition, the signals for needle valve lift sensor, and the reference pulses. When it is judged that the timing is not right for putting out drive pulse Dp (No), the control unit is returned to said input step and to the computation step until the right time to put out comes, and when the timing is right for putting out the Dp (Yes), the control unit advances to step 62.

In Step 62, the desired injection level computed at the computation step is judged whether it is 0 or not, and if it is judged as 0 (Yes), the control unit goes to other control process without putting out the drive pulse Dp, and it is returned to said input step and to the computation step. On the other hand, if it is judged that the desired injection level is not 0 (No), it goes to the next Step 64. In Step 64, valve closed-time length Tq computed in the computation step and the time-lag length Tv described later are added to compute drive pulse width Td, and in Step 66, drive pulse Dp having this drive pulse width Td is put out to driving circuit 51.

In Step 68, the signals from closed valve detector 45 are input, and in the next Step 70, it is judged whether the valve seating signals DVC are input or not. If valve member 23 is not seated on valve seat 24 due to the time lag in the valve's closing, the control unit goes to Step 72 and judges whether the Tq has a negative value or not.

In the control of normal driving in which the Tq is positive, since the drive-pulse width Td is greater than the time lag Tv, valve member 23 is seated on valve seat 24, and seating signals DVC are put out from valve close detector 45 to be input in the microcomputer. Therefore, if the Tq is positive, the processes in Step 68 through Step 72 are repeated via the clocking process. Then, in Step 74, the time length while the drive pulse Dp is put out and the valve seating signals DVC are input is clocked. Thus, the clocking that began when the DVC was input is brought to a halt, and the control unit advances to Step 76.

In Step 76, based on the latest clocking result that has been averaged and on the new clocking result, a new average value of the Tv is computed, and the Tv is renewed. In the subsequent Step 64, Td is computed from this renewed Td.

On the other hand, since the Tq is set at a negative value at the time of idling, the drive pulse width Td becomes smaller than the time lag Tv; although valve 23 is driven toward the valve seat, it normally is moved apart prior to seating on valve seat 24. The seating signals DVC, therefore, are not put out from closed-valve detector 45, and the DVC is not input in the microcomputer. Therefore, if the Tq is judged as negative in Step 72, the controller unit by-passes Step 76, and uses the latest average value computed in the past for the subsequent process.

Figure 7:
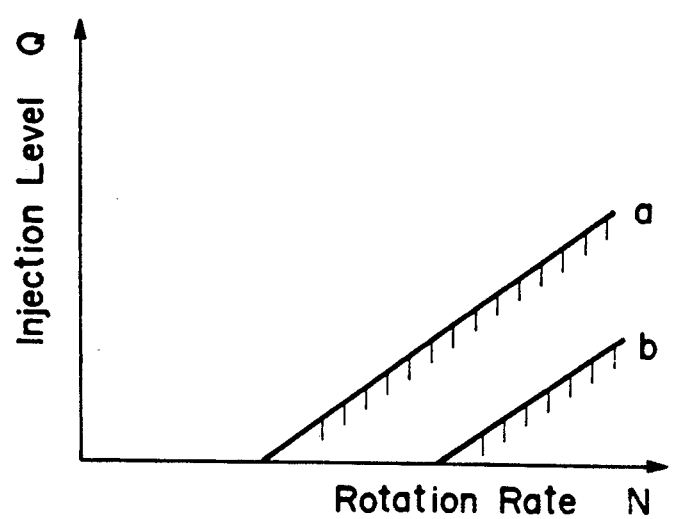
FIG. 7 is a graph showing the characteristics of the fuel-injection control disability domain in contrast to the engine rotation number.

In controlling the small engine load at the time of idling (hereinafter, the control is called as an extremely small control, the then injection as an extremely small injection, and the then injection level is called an extremely small injection level), as shown by the real lines in FIG. 6, the valve lift level (VL) can be controlled to be smaller by setting the pulse width Td of drive pulse Dp at a smaller pulse width than the Tv, and by shortening the time length for supplying the current to solenoid 32. Therefore, as shown by dotted lines in FIG. 6, relative to the conventional device, wherein electric conduction is supplied to solenoid 32 until valve member 23 is seated on valve seat 24, in other words, relative to the conventional device wherein the extremely small injection control disability domain is below the a line, the control disability domain (below the b line) can be made smaller in the present invention, as shown by the b line in FIG. 7; therefore, the control range at the time of high rotation low injection (at the time of idling) can be widened.

In addition, in an example of preferred embodiment of the present invention, a unit injector is used as the fuel-injection pump, the control in the present invention is applicable to a distribution type or array-type, regardless of the type of injection pump.

As explained above, according to the present invention, when fuel is injected to the internal combustion engine by controlling the solenoid valve in opening/closing, the pulse width for actuating the solenoid valve is made to be shorter than the valve-closed time lag at the time of low load, to eliminate the solenoid valve's closing or the valve-closed time length is minimized so that the high-pressure fuel in the compressor will leak to the low-pressure side. Therefore, the extremely small injection amount can be smaller than that in the conventional device, and the possible range to control the injection level in low load with high rotation range can be widened.

What is claimed is:

1. A fuel-injection device of an engine, comprising:
   a fuel-injection pump having a nozzle, a cylinder, a plunger slidably received in said cylinder so as to form a compression chamber therewith, a high-pressure passage guiding the fuel in said compression chamber to said nozzle, and a fuel-supply passage to supply the fuel flowing in from a fuel intake to said compression chamber;
   a solenoid valve, including a solenoid and a valve member, installed at some point along the fuel supply passage of said fuel-injection pump, said valve being controllable by external signals supplied to the solenoid to adjust the condition of communication between the compression chamber and the fuel intake via said fuel-supply passage;
   a pulse supply time length computation means for computing a drive pulse of a duration which is the sum of a time lag in moving a valve member of said solenoid valve to a closed position and the time of valve closing necessary to keep the valve member in said closed position to obtain a desired fuel-injection level, said pulse supply time length computation means computing a said drive pulse of a duration which is shorter than a said time lag when the engine load is low;
   a valve control means for regulating the fuel injection level to said desired level by supplying current to said solenoid of the solenoid valve for a time corresponding to the duration of said drive pulse computed by said pulse supply time computation means.

2. A fuel-injection device as recited in claim 1, wherein said pulse supply time length computation means includes a clock which clocks the time spent until an inflection point occurs in the current supplied to said solenoid after drive pulses for activating said solenoid valve are output, detects said inflection point by substantially detecting a change in the current supplied when said valve shuts off the fuel-supply passage, and computes said time of valve closing based on the time clocked by said clock.

3. A fuel-injection device as recited in claim 2, wherein said pulse supply time length computation means computes said time of valve closing every time said valve shuts off the fuel-supply passage.

4. A fuel-injection device as recited in claim 2, wherein said pulse supply time length computation means computes said time of valve closing by averaging past clocked times and a newly clocked time.

5. A fuel-injection device as recited in claim 1, wherein said pulse supply time length computation means is connected to an acceleration level detector of the engine which detects the level to which an acceleration pedal is pressed, and to an engine rotation detector, and said pulse supply time length computation means computes said time of valve closing on the bases of the level at which the acceleration pedal is pressed, as sensed by said acceleration level detector, and an engine rotation condition, as detected by said engine rotation detector, by converting said desired injection level to a cam angle of a cam necessary for obtaining the injection level and, subsequently, by computing the time needed for the cam to rotate over the cam angle.

6. A fuel-injection device as recited in claim 1, wherein said fuel-injection pump has a valve at said nozzle thereof, said fuel-injection pump is connected to a drive shaft which drives the plunger of said pump, said valve control means is connected to an engine rotation detector, and to a valve lift sensor which senses the lift of the valve at the nozzle of the fuel injection pump, and said valve control means outputs pulses to actuate said solenoid valve under an output timing based on engine rotation, as detected by said engine rotation detector, valve lift of the nozzle of the fuel-injection pump, as detected by said valve lift sensor, and pulses that are generated each time said drive shaft reaches a reference angle.

7. A fuel-injection device as recited in claim 1, wherein said pulse supply time length computation means computes a pulse supply time defining said time of valve closing as a negative value when the engine load is low.

8. A fuel-injection device as recited in claim 1, wherein said valve member of the solenoid valve moves to a position which cuts off the communication of the compression chamber and the fuel intake via said fuel-supply passage when current is supplied to said solenoid valve, and moves to a position which places the compression chamber and the fuel intake in communication via said fuel supply passage when the supply of current of said solenoid valve is terminated.

9. A fuel-injection device as recited in claim 1, wherein the solenoid valve comprises: a rod integral with said valve member; a valve housing extending to a side of said injection pump, said rod integral with said valve member being slidably received in the housing, and the housing having a valve seat for seating said valve member; a header mounted on said valve housing over said valve member, and forming a space together with said valve housing to accommodate said valve member, said solenoid being installed on an opposite side of said valve housing from said header; an armature secured to said rod, said solenoid facing said armature; and a spring that constantly biases said valve member away from said valve seat, said fuel-supply passage extending to said space for accommodating said valve member, and to a location around said rod that communicates with said space when the solenoid valve is opened.

10. A fuel injection device as recited in claim 1, wherein the fuel-injection pump is a unit injector which supplies fuel to only one respective cylinder of the engine.

* * * * *